May 9, 1967   C. A. KIRCHNER   3,318,389
FLEXIBLE ROTARY HOE CONTROL AND CARRIER
Filed Oct. 29, 1964   2 Sheets-Sheet 1

INVENTOR.
Clarence A. Kirchner
BY
Sam J. Slotsky
ATTORNEY

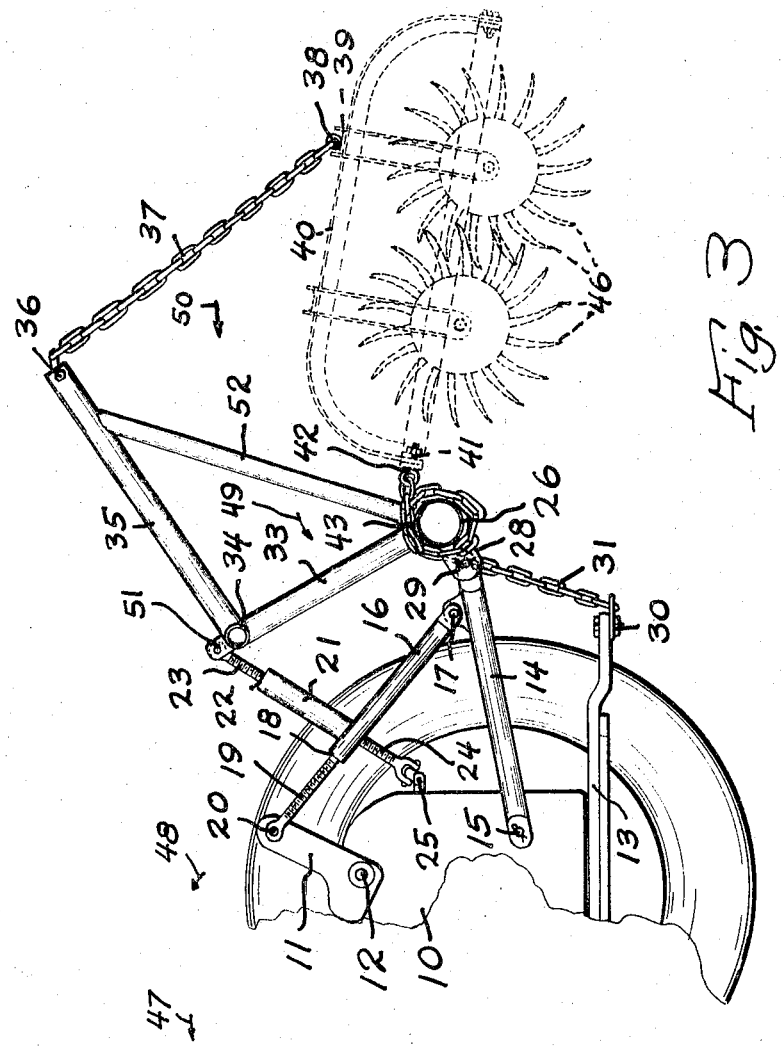

United States Patent Office 3,318,389
Patented May 9, 1967

3,318,389
FLEXIBLE ROTARY HOE CONTROL
AND CARRIER
Clarence A. Kirchner, Avoca, Minn. 56114
Filed Oct. 29, 1964, Ser. No. 407,339
6 Claims. (Cl. 172—445)

My invention relates to a rotary hoe carrier.

An object of my invention is to provide a carrier which will provide a control in which the hoe itself can move flexibly over the soil regardless of the contour thereof.

A further object of my invention is to provide a completely flexible arrangement for a three-point tractor attachment, and which hoe includes floating characteristics, and which carrier will include means attendant therewith for automatically raising the hoe off of the ground when it is desired to transport the same from place to place, and wherein the hoe will be tightly engaged so that it will not rattle or sway during the transporting operation.

A further object of my invention is to provide means for automatically raising the hoe merely upon simple movements of the three-point arrangement.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 3 is an enlarged end view.

Figure 1:
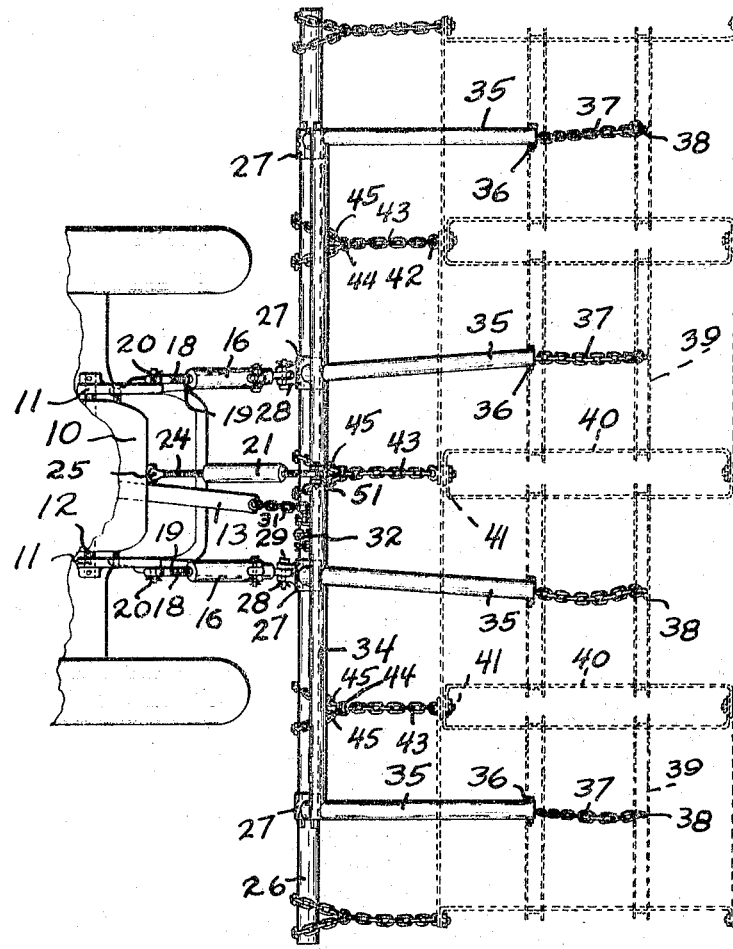
FIGURE 1 is a plan view of my device as used with the hoe.

My invention contemplates the provision of a carrier attachable to the rear of a tractor, and which carrier will accommodate a rotary hoe, and will provide means for drawing the hoe along the ground and yet maintaining the hoe in a completely flexible and floating condition whereby it will easily follow soil contours and the like without being rigidly connected, and whereby after use the hoe can be quickly and readily raised to transporting position by means of a simple operation of the three-point suspension system of the tractor to which the framework is attached.

My invention also contemplates the provision of such a unit which will also draw and transport other devices.

In describing my invention I have used the character 10 to designate the rear portion of a tractor having the arms 11 which are attached to the transverse shaft 12 which is hydraulically operated as in usual tractor construction, and I have further used the character 13 to designate a draw-bar, the character 14 indicating three-point attachment members pivoted at 15 to the tractor, the character 16 indicating further support members pivotally attached at 17 to the members 14, the members 16 being threadably engaged at 18 with the rods 19 for adjustment, the rods 19 being pivoted at 20 to the members 11. The character 21 indicates a further member on the three-point arrangement threadably engaged at 22 for adjustment with the rod 23, the member 21 being threadably engaged with the further rod 24 which is pivoted at 25 to the rear of the tractor.

The above description relates more or less to conventional three-point construction methods, and in now describing my invention I have used the character 26 to indicate a lower pipe which is mounted transversely in the bearing members 27, two bearing members 27 being secured to the ears 28 which are pivotally attached at 29 at the terminals of the members 14.

Attached at 30 to the end of the draw-bar 13 is a chain 31 which is wrapped about the pipe 26 as at 32 and secured thereto.

Attached to the pipe 26 are the arms 33 which are secured to a further upper transverse pipe 34 to which pipe 34 are rigidly secured the rearwardly extending tubes 35, and attached at 36 to the tubes 35 are the chains 37 which are suitably attached at 38 to one of the framework members 39 of the hoe itself, the members 39 and the hoe being shown dotted for clarity, the characters 40 and 41 indicating further hoe framework portions.

Attached to the member 41 at 42 are the further chains 43 which are secured as at 44 to the pairs of diverging chains 45 which are also wrapped about the lower pipe 26, but in the reverse manner as shown, so that rotation of the pipe 26 in one direction by means of the chain 31 will cause the chains 43 and 45 to wind onto the pipe 26.

The hoe teeth are indicated generally by means of the character 46.

Figure 2:
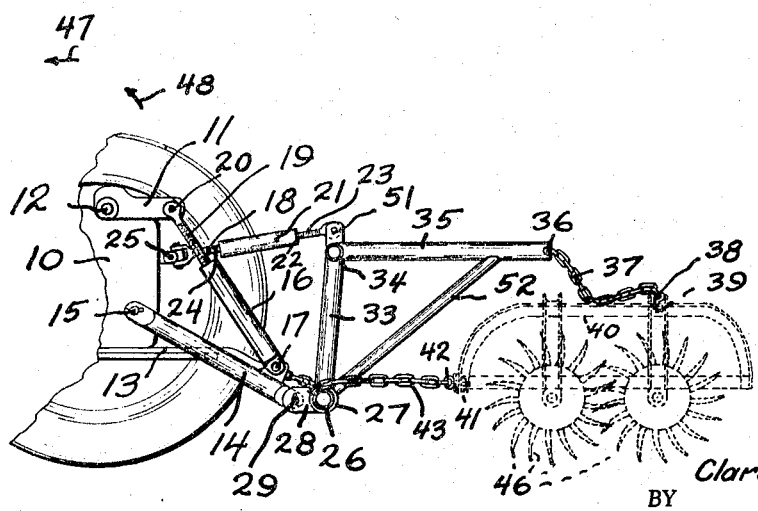
FIGURE 2 is a side elevation of FIGURE 1.

The arrangement operates in the following manner. FIGURE 2 shows the arrangement as it is being used for hoeing in which case the chains 45 and 43 will be drawn tightly and will be actually pulling the hoe and the framework thereof as the tractor travels in the direction of the arrow 47, and the chains 37 will be loosely hung as shown.

During this travel, it will be noted that the hoe will be in a free floating condition and can travel over the ground regardless of the contour thereof, and will be in no way rigidly attached at any point to thereby provide all of the necessary free flexible motion required.

When it is desired to transport the hoe the three-point suspension system is operated, and the member 11 is operated to rotate in the direction of the arrow 48. During rotation of the member 11 in this direction, the members 19, 16 will draw the members 14 upwardly as shown in FIGURE 3, and since the chain 31 is secured to the draw-bar 13, the raising of the pipe 26 by the members 14 will cause the pipe to rotate in the direction of the arrow 49. This rotation of the pipe 26 will also cause the chains 43, 45 to draw the complete hoe framework etc. in the direction of the arrow 50 toward the pipe 26, the attachment at 21, 23, and 51 providing a rigid support at all times, and in this way the hoe framework etc. will be drawn upwardly and off of the ground, and will be suspended in tightly engaged relation, the chains 37 providing further support at this point, so that the complete hoe can then be transported from place to place in a convenient manner, reverse action providing a reverse effect when it is desired to use the hoe again. The character 52 indicates braces.

The Y-shaped chain construction at 45 in connection with the chains 43 provides additional stability to the hoe when it is traveling along ground to provide a straight forward motion.

It will now be seen that I have provided the advantages mentioned in the objects of my invention with further advantages being apparent.

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In combination with a tractor having a hydraulic power source and a supporting unit attached thereto, a flexible rotary hoe control and carrier comprising a framework, said framework being adapted to support a rotary hoe, a transversely positioned pipe rotatably journalled on said supporting unit, a flexible element attached to said pipe and wrapped about the same, means for attaching said flexible element attached to said pipe and wrapped about the same, means for attaching said flexible element to said tractor draw-bar, further flexible elements passing about said pipe and being attached to said rotary hoe, upward movement of said pipe with respect to said draw-bar causing said flebixle element to rotate said pipe and to thereby cause reeling of said further flexible elements onto said pipe, said hydraulic power source being adapted to raise said pipe.

2. In combination with a tractor having a hydraulic power source and a supporting unit attached thereto, a flexible rotary hoe control and carrier comprising a framework, said framework being adapted to support a rotary hoe, said framework including a transversely positioned pipe, a flexible element attached to said pipe and wrapped about the same, means for attaching said flexible element to said tractor draw-bar, further flexible elements passing about said pipe and being attached to said rotary hoe, upward movement of said pipe with respect to said draw-bar causing said flexible element to rotate said pipe and to thereby cause reeling of said further flexible elements onto said pipe, said hydraulic power source beibng adapted to raise said pipe, said supporting unit including a three-point suspension system pivotally attached to said tractor, said three-point suspension system including a pair of lower pivoting members operated by said hydraulic power source, said pipe being pivoted to said lower pivoting members.

3. In combination with a tractor having a hydraulic power source and a supporting unit attached thereto, a flexible rotary hoe control and carrier comprising a framework, said framework being adapted to support a rotary hoe, said framework including a transversely positioned pipe, a flexible element attached to said pipe and wrapped about the same, means for attaching said flexible element to said tractor draw-bar, further flexible elements passing about said pipe and being attached to said rotary hoe, upward movement of said pipe with respect to said draw-bar causing said flexible element to rotate said pipe and to thereby cause reeling of said further flexible elements onto said pipe, said hydraulic power source being adapted to raise said pipe, said supporting unit including a three-point suspension system pivotally attached to said tractor, said three-point suspension system including a pair of lower pivoting members operated by said hydraulic power source, said pipe being pivoted to said lower pivoting members, support bars secured to said transverse pipe, further bars attached to the upper terminals of said support bars and extending at substantially right angles to said support bars and co-planar therewith, still further flexible elements attached to the ends of said further bars and to said rotary hoe.

4. In combination with a tractor having a hydraulic power source and a supporting unit attached thereto, a flexible rotary hoe control and carrier comprising a framework, said framework being adapted to support a rotary hoe, said framework including a transversely positioned pipe, a flexible element attached to said pipe and wrapped about the same, means for attaching said flexible element to said tractor draw-bar, further flexible elements passing about said pipe and being attached to said rotary hoe, upward movement of said pipe with respect to said draw-bar causing said flexible element to rotate said pipe and to thereby cause reeling of said further flexible elements onto said pipe, said hydraulic power source being adapted to raise said pipe, said supporting unit including a three-point suspension system pivotally attached to said tractor, said three-point suspension system including a pair of lower pivoting members operated by said hydraulic power source, said pipe beibng pivoted to said lower pivoting members, support bars secured to said transverse pipe, further bars attached to the upper terminals of said support bars and extending at substantially right angles to said support bars and co-planar therewith, still further flexible elements attached to the ends of said further bars and to said rotary hoe, said reeling of said pipe causing said rotary hoe to be drawn closely adjacent to said pipe when in raised position to provide means for transporting said rotary hoe.

5. In combination with the three-point suspension system of a tractor having a power source, a framework for supporting an agricultural tool thereon, said suspension system including raisable members, a transversely positioned pipe rotatably journalled on said suspension system, further framework portions extending from said pipe and adapted to support said tool, a flexible element wound about said pipe and attached to a rigid portion of said tractor whereby raising of said pipe will cause rotation of said pipe, further flexible elements wound on said pipe and attached to said tool, said further flexible elements being reeled onto said pipe incidental upon rotation of said pipe.

6. In combination with the three-point suspension system of a tractor having a power source, a framework for supporting an agricultural tool thereon, said suspension system including raisable members, a transversely positioned pipe rotatably journalled on said suspension system, further framework portions extending from said pipe and adapted to support said tool, a flexible element wound about said pipe and attached to a rigid portion of said tractor whereby raising of said pipe will cause rotation of said pipe, further flexible elements wound on said pipe and attached to said tool, said further flexible elements being reeled onto said pipe incidental upon rotation of said pipe, chains attached to the ends of said further framework portions and being attached to said tool, said further flexible elements including substantially Y-shaped portions wound upon said pipe.

References Cited by the Examiner

UNITED STATES PATENTS

| | | | |
|---|---|---|---|
| 2,633,788 | 4/1953 | Nelson | 172—210 X |
| 2,839,980 | 6/1958 | Evans et al. | 172—449 |

FOREIGN PATENTS

| | | |
|---|---|---|
| 576,815 | 6/1959 | Canada. |
| 87,084 | 1/1956 | Norway. |

ABRAHAM G. STONE, *Primary Examiner.*

WILLIAM A. SMITH III, *Examiner.*